May 29, 1956  R. K. SCHELKE ET AL  2,748,367
ELECTRICAL CONNECTOR
Filed Feb. 28, 1952   2 Sheets-Sheet 1
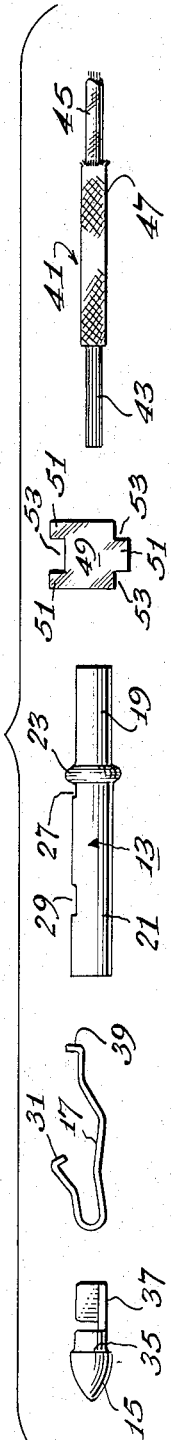
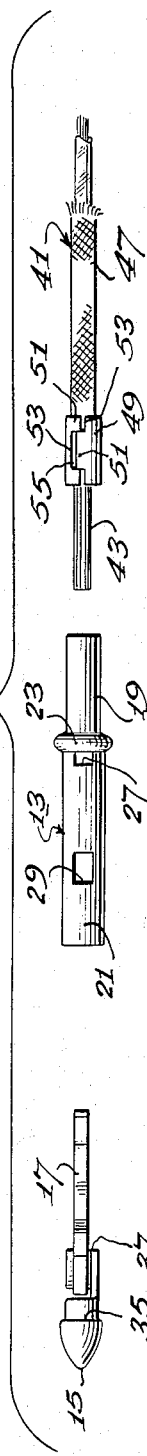
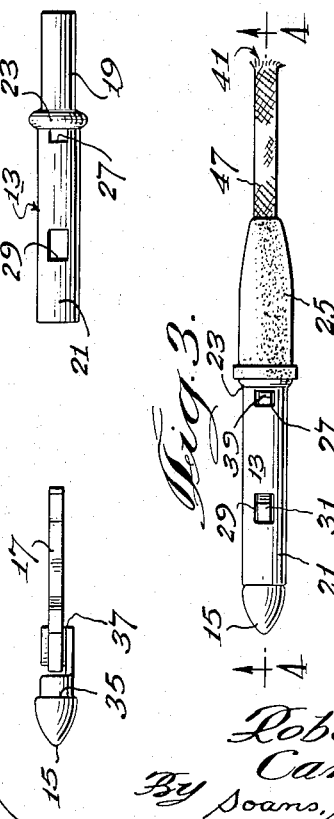
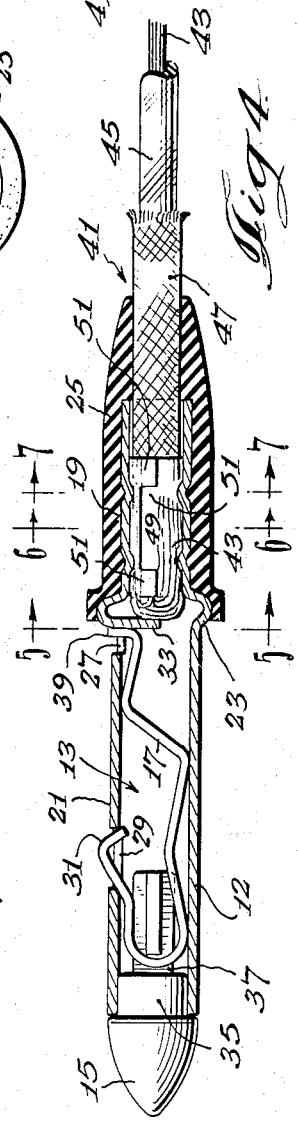
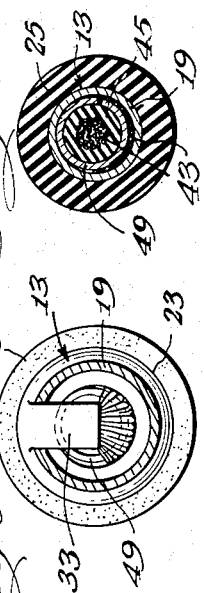
Inventors
Robert K. Schelke
Carl M. Huth
By Soans, Glaister & Anderson
Attorneys

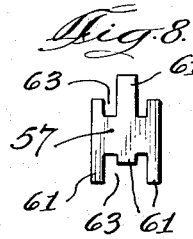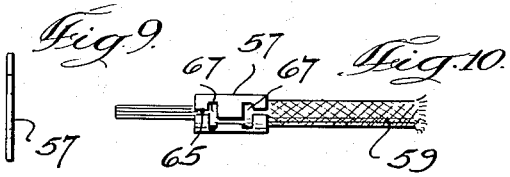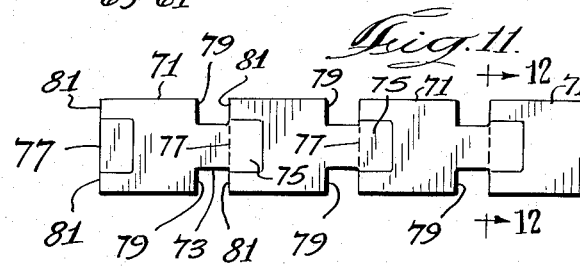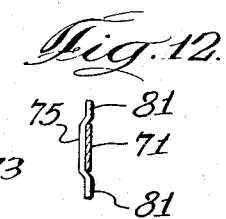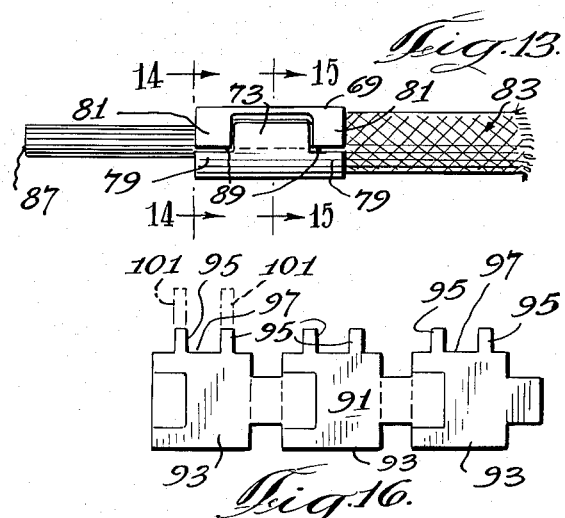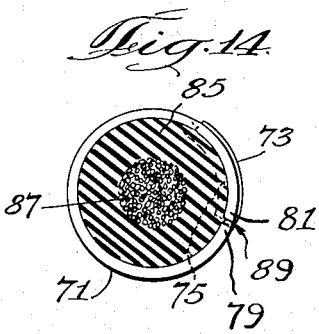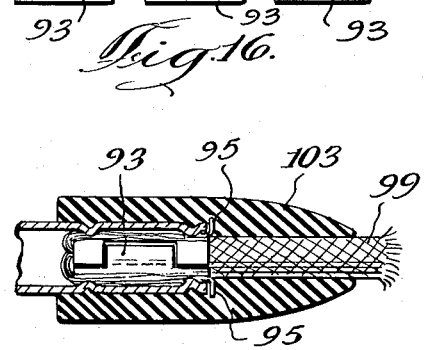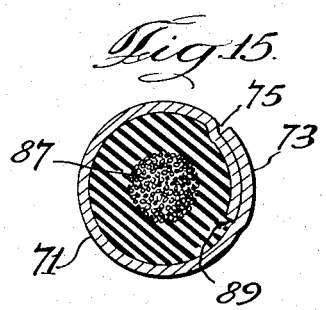

United States Patent Office 2,748,367
Patented May 29, 1956

2,748,367
ELECTRICAL CONNECTOR

Robert K. Schelke and Carl M. Huth, Richmond, Ind., assignors to Belden Manufacturing Company, Chicago, Ill., a corporation of Illinois Application February 28, 1952, Serial No. 273,954

13 Claims. (Cl. 339—252)

This invention relates generally to electrical connectors and is more particularly directed to electrical terminal connectors of the type having a hollow tubular part for receiving one end of the wire or cord with which the connector is used.

In the applying of terminal connectors to electrical wires and cords, there exists the primary problem of providing a low resistance, electrical connection between the connector terminal and the associated conductor. In addition, it is of very great importance that this connection shall be effected in a manner which provides a strong mechanical bond between the connector terminal and the associated wire or cord, this in order to withstand the stresses imposed on the connection during manufacture and use. Of the various terminal connectors which have been designed to accomplish the above stated functions, one of the best known and one of the most widely used types, especially with single conductor cords and wires, includes a hollow, generally tubular, deformable portion which is adapted to receive one end of the wire and to be crimped thereon. This construction usually provides a low resistance electrical connection, but the mechanical properties of the connection are not wholly satisfactory for all uses.

More particularly, when a terminal connector having a tubular conductor receiving portion is crimped onto the bared end of a conductor so as to establish a low-resistance, electrical connection, the forces incident to the establishing of that connection quite frequently result in the creation of stresses which weaken the metallic conductor and render it susceptible to breakage during use. This is especially undesirable in instances where the wire conductor is subject to bending stresses during use, as for example, in the making of temporary connections on a plug board.

In an effort to limit this stressing of the wire conductor, a practice has developed of bending a bared end portion of the conductor backwardly over the adjacent insulation and crimping the terminal connector onto that portion of the wire. This has the advantage that at least a portion of the mechanical stress is taken up in the insulation and there is noticeable improvement in the mechanical characteristics of the connection, at least when it is first made. However, this procedure frequently fails to result in an electrical connection of the desired low-resistance, and further, due to the fact that many types of insulation become at least slightly plastic when heated, or tend to flow when stressed for a considerable period of time, connections made in this manner frequently lack permanence.

There is, therefore, an existing need in the art for an improved type of crimped-on connection which will produce a low-resistance, electrical connection of good mechanical characteristics, and which will maintain the low resistance and mechanical properties without impairment during use. The principal object of the present invention is the provision of such a connection.

As will hereinafter appear, this object of the invention is accomplished by the provision of a metal clip member or band which is applied about the wire or conductor to which the terminal connector is to be crimped in encircling relationship therewith, this member being of such design and proportions that it is effective to provide a sleeve-like compression-resisting element adapted to coact with the tubular conductor receiving portion of the terminal connector during the crimping operation to produce a low-resistance, electrical connection of high mechanical strength. The arrangement also makes possible a connection which inherently accomplishes an effective strain relief function, and the mechanical and electrical properties of the connection are in no way dependent upon, or affected by, the character of the insulation which may be applied to the conductor wire.

A further object of the invention is the provision of an improved mono-cord plug connector for use with plug-jack stationary contacts and the like, and especially the provision of a plug type terminal connector which is adapted to utilize crimped-on connections in accordance with the principal object of the invention and which includes means for aiding in the positioning of the wire conductor with relation to the connector during assembly.

Other objects and variations of the advantages of the invention will be made apparent in the accompanying drawings and the following description of certain illustrative embodiments thereof.

In the drawings:

Figure 1 is an exploded view of a monocord, plug-type, terminal connector in accordance with the invention, and of the end portion of a multi-strand, insulated wire prior to the assembling of the connector and the attachment of the connector to the wire;

Figure 2 is an elevational view of the structural elements illustrated in Figure 1, in partially assembled relationship;

Figure 3 is an elevational view showing the connector of Figure 1 fully assembled and applied to the end of the wire. The view also illustrates an insulating grip or sleeve which may be molded onto the rear end of the connector;

Figure 4 is an enlarged, sectional view of the assembled connector and wire illustrated in Figure 3;

Figures 5, 6 and 7 are sectional views taken respectively on the lines 5—5, 6—6 and 7—7 of Figure 4;

Figures 8 and 9 are, respectively, plan and side elevational views of another type of clip or band design for application to a wire or cord in the production of an electrical connection in accordance with the present invention;

Figure 10 is an elevational view showing the application of a clip or band of the type shown in Figures 8 and 9 to an insulated conductor wire;

Figure 11 is a plan view of a third type of clip or band design in accordance with the invention;

Figure 12 is a sectional view on the general line 12—12 of Figure 11;

Figure 13 is an elevational view showing one of the clip or band elements of the type illustrated in Figures 11 and 12 applied to the end of a lead wire;

Figures 14 and 15 are sectional views taken on the lines 14—14 and 15—15 of Figure 13;

Figure 16 is a plan view of still another type of clip or band in accordance with the invention; and Figure 17 is a fragmentary, sectional view illustrating one manner in which the clip or band elements shown in Figure 16 may be used.

The improved mono-cord terminal connector illustrated in Figures 1 through 7 of the drawings comprises three main parts: a tubular barrel 13, which is manufactured of light gauge metal, for example, No. 26 ga.

annealed, hard brass, a nose portion 15, which is adapted to fit within the outer end of the barrel 13, and a spring 17 which accomplishes the multiple functions of holding the nose portion 15 in place within the connector barrel 13 and of holding the assembled plug in place in the stationary jack contact or plug board with which the plug connector is used. The barrel 13 includes a rearward section 19 of reduced diameter which is adapted to receive the end of the wire or cord with which the connector is used and a forward section 21 which serves as the contact portion of the barrel. A bead 23 is provided intermediate the two sections 19 and 21 for facilitating the locating of an insulating grip or sleeve 25 which is normally applied to the rearward or lead end of the connectors of this type.

Two rectangular openings 27 and 29 are provided along the length of the contact portion 21 of the barrel 13. The forward opening 29 is punched clear and is adapted to receive a curved portion 31 of the spring 17, as shown particularly in Figure 4. The other opening 27 is punched on only three of its sides and the metal from the punched-out region is bent backwardly to provide a wall or lug 33 which extends at right angles to the longitudinal axis of the contact barrel. In the illustrated structure, the punched openings 27 and 29 are in line with each other. It will be understood, however, that this is merely illustrative, since the openings may be angularly displaced in any desired arrangement.

The nose portion 15 of the contact is generally bullet-shaped and includes a reduced area shoulder portion 35 which is adapted to fit within the end of the forward section 21 of the contact barrel. The nose portion 15 also includes a notched, guide and locking section 37 which is generally T-shaped in cross section. This T-shaped section 37 is of such dimensions and is so proportioned that it slidably engages diametrically opposed portions of the inner surface of the contact barrel so as to support and position the nose portion therewithin.

The spring member 17 is also adapted to fit within the contact portion 21 of the contact barrel. Prior to assembly, the spring 17, which is preformed from a flat ribbon of spring material to the shape shown in Figure 1, is hooked into the notch in the T-section 37 of the nose portion 15, and the relative proportions of the parts are such that the engagement of the curved section 31 of the spring with the forward opening 29 effectively locks the nose portion 15 against fore and aft movement relative to the barrel 13. The correct positioning of the spring 17 is further aided and the parts locked against separation by an angle section 39 at the inner end thereof, which abuts against the lug 33 and extends into the rearward, punched opening 27, as illustrated. The spring 17 is made of quite stiff material in order to provide adequate mechanical strength and good mechanical engagement between the barrel and the cooperating jack.

The rearward or cord-receiving section 19 of the connector barrel 13 is intended to be electrically and mechanically connected to the lead wire or cord with which the terminal connector is used, and in the making of this connection, it is particularly advantageous to employ the improved type of crimped-on connection of the present invention. In the illustrated embodiment of the invention, a length of a suitable single conductor lead wire is indicated generally at 41. The lead wire 41 includes a multi-strand, flexible conductor 43, an insulating sleeve 45, which directly overlies the conductor 43 and which may be of a thermoplastic insulating material, and an outer jacket 47 of fabric braid or other wear-resistant material.

In the making of the electrical and mechanical connection between the terminal connector and the lead wire 41, the insulation is first removed from an end portion of the wire conductor 43. The length of the bared end portion should be somewhat less than the axial length of the tubular, conductor-receiving section 19 of the connector. Next, a metal band or clip 49, the opposite ends of which are desirably provided with inter-engaging projections 51 and recesses 53, is wrapped around the lead wire insulation immediately adjacent the bared end portion of the conductor 43, as shown particularly in Figures 2 and 4.

The dimensions and physical properties of this clip or band 49 are of considerable importance in the attainment of the objects of the invention. In order that the clip or band will compressively engage the lead wire with a predetermined force at the conclusion of the crimping operation, the dimensions of the clip or band are such that when it is wrapped snugly around the insulation of the cord or lead wire with which it is used, the opposed abutting edges of the interfitting end portions 51 and 53 are spaced-apart a short distance, as illustrated at 55 in Figure 2. The amount of this spacing determines the magnitude of the compressive force exerted by the band on the lead wire insulation after the crimping operation, and hence, this dimension can be used to determine exactly how tightly the band engages the lead wire insulation.

To secure a joint of the maximum possible strength, the clip or band 49 should be made of metal of such thickness and physical properties that the generally cylindrically-shaped sleeve which results when the band is wrapped around the lead wire insulation, will have a compressive strength which is at least substantially equal to the compressive strength of the tubular connector portion with which it is used. Also, the yield point of the metal of which the band is made should be at least approximately equal to the yield point of the metal of which the conductor receiving portion of the connector is made.

Following the application of the clip or band 49 to the lead wire insulation, the bared end portion of the lead wire conductor 43 is bent backwardly, as shown in Figure 4, and the individual wire conductors are pressed flat against the outer surface of the clip or band member. The interfitting projections and recesses 51 and 53 aid in assuring the correct alignment of the band as it is applied to the wire insulation, and thus aid in assuring that the band member will develop its maximum strength as a compression-resisting member. Also, the interfitting projections and recesses 51 and 53 provide a continuous surface along the periphery of the clip or band 49 which prevents the individual stranded conductors from getting into the space 55 between the spaced-apart, edge surfaces of the band prior to the crimping operation.

The relative proportions of the conductor-receiving section 19 of the connector, the lead wire 41 and the band 49 are such that when the bared end portion of the lead wire conductor 43 is bent back over the band 49, that end of the lead wire may be inserted into the conductor-receiving section 19 with a reasonably snug fit. The internal lug 33, which is provided by the metal bent in from the punched-out opening 27, assures accurate positioning of the lead end and the attached band within the conductor-receiving section 19.

With the lead end in this position, a crimping tool of suitable design is applied to the conductor-receiving section 19 of the connector terminal to effect connection of the parts. Desirably, the crimping tool is of the type which produces simultaneously a plurality of uniformly spaced, oppositely disposed indentations or crimps. The structure shown in Figure 7 is of the type wherein two pairs of diametrically-opposed indentations have been produced in the conductor-receiving section 19 of the connector barrel 13. Other types of crimping tools may, of course, be used. It is also desirable that at least two, spaced-apart sets of crimps shall be formed along the length of the conductor-receiving section of the connector barrel, and such an arrangement is shown in Figure 4.

The initial deformation of the contact-receiving section which occurs during the first stages of the crimping operation has the effect of causing the clip or band 49 to tighten about the lead wire insulation to an extent which is determined by the space 55 between the opposed end surfaces of that band. This spacing, as previously described, thus determines the magnitude of the compressive force with which the clip or band engages the lead wire insulation. Generally, this engagement should be of such nature that the band will not move relative to the lead wire insulation when subjected to stresses of a magnitude equal to the normal tensional stresses to which the assembled connector might be subjected during use.

As the crimping operation progresses, following the forming of the clip or band 19 into a compression-resisting sleeve, deformation of that member occurs, as illustrated particularly in Figures 4 and 7. The crimping is carried to such a point that the yield point of the metal in both the conductor-receiving section 19 of the barrel and in the band 49 is exceeded, with the result that the parts are permanently joined in a connection having very low electrical resistance and excellent mechanical strength. As previously pointed out, the maximum strength will be developed in this connection when the internal sleeve is at least as strong in resisting compression as the conductor-receiving section of the connector, and when the yield points of the metals of which the two cooperating parts are made are substantially the same.

Following the crimping operation, it will generally be found convenient to apply the insulating grip or sleeve 25 to the rearward or lead end of the connection. The sleeve 25 also accomplishes a protective function in that it encloses the rearward end of the terminal connector and stiffens the lead wire against bending in the region of the connector. The sleeve 25 is preferably of a molded-on type and may be made of a suitable rubber or other molding compound. It will be understood, however, that the sleeve 25 may be manufactured separately and adhesively attached in the position shown. In the particular construction illustrated in the drawings, the bead 23 formed intermediate the contact and conductor-receiving sections of the contact barrel constitutes a convenient means for assuring proper positioning of the grip or sleeve.

The other elements of the terminal connector, i. e. the nose portion 15 and the spring 17, can be inserted into the forward end of the connector barrel either before or after the attachment of the lead wire, since, the lug 33 not only prevents the lead wire from being accidentally misplaced into the contact section of the barrel, but in addition, it accurately positions the inner end of the spring relative to the connector, regardless of when it is inserted thereinto. This use of the metal which is cut-away in defining the locking opening 27 for the inner end of the spring to provide a position lug for the lead wire and for the spring 17 is an important feature of the connecting terminal illustrated in the drawings, and is of very great value in making possible the rapid and convenient assembly of the structure so as to provide terminal connectors of uniformly high quality.

It is possible to use clip or band elements of other types in the production of low-resistance, high mechanical strength electrical connections in accordance with the present invention. One such clip or band member having certain advantages when used in conjunction with some types of lead wires, is illustrated at 57 in Figures 8 and 9, and is shown applied to a lead wire 59 in Figure 10. The clip or band member 57, like the member 49, is conveniently punched from a flat strip of metal, such as a medium or hard brass. It also includes cooperating, inter-engaging projections 61 and recesses 63 which coact when the band is wrapped around the lead wire or cord with which it is used, so as to provide a continuous surface along the periphery of the clip or band, despite the fact that the opposed end edge portions of that member are spaced apart a short distance, as illustrated at 65.

The construction differs from the clip or band member illustrated at 49 in that the central projections 61 have a somewhat less width than the opposed recesses 63 into which they extend. As a result of this, spaced, open slots 67 are provided along the length of the sleeve element which results when the band is applied to a lead wire, as shown particularly in Figure 10. When the clip or band member 57 is compressed to close the spaces 65 and to bring the edge portions of the clip or band into engagement, there is a tendency for the insulation to be pressed into the slots 67, and this results in an improved, frictional engagement between the clip or band member and the insulation of the associated lead wire or cord. It is of particular value in connection with certain types of insulation.

Another type of clip or band element in accordance with the present invention is shown in Figures 11 to 15. In this embodiment of the invention, a flat strip of metal, such as No. 26 gauge, medium or hard brass, having the general characteristics described above with respect to the metal used in the manufacture of the clip 19, is punched or otherwise shaped to form a strip 69 of interconnected clip or band members 71. The opposite ends of each of the clip or band members 71 include a tongue portion 73 and an offset or depressed portion 75 which may be somewhat wider than the tongue portion 73. The individual clip or band members 71 which constitute the strip 69 are inter-connected by the tongue portions 73, and during use, the individual clip or band units are severed from the body of the strip 69 along the lines indicated at 77, which may be scored to facilitate the severing operation.

When one of the clip or band members 71 is wrapped around the lead wire with which it is used to form a compression-resisting sleeve element, as shown in Figure 13, the projecting tongue 73 will fit into the depressed surface portion 75 (Figs. 14 and 15). Depending upon the magnitude of the compressive force with which the clip is to engage the lead wire insulation at the conclusion of the crimping operation, the clip 71 will be of such dimensions, relative to the lead wire, such that the opposing surfaces of the edge portions 79 and 81 of the clip will be spaced apart a short distance when the clip is in snug engagement with the lead wire insulation. An example of this is shown in Figures 13, 14 and 15, wherein the lead wire is indicated at 83, the lead wire insulation at 85, the lead wire conductor at 87, and the spacing between the opposed surfaces of the portions 79 and 81 at 89.

The interfitting engagement of the tongue portion 73 and the depressed portion 75 provide a continuous surface along the periphery of the clip or band 71 following its application to the lead wire. This prevents the individual conductors which are bent back over the clip or band from getting into the spaces 89 between the spaced-apart edge surfaces of the band prior to the crimping operation. The completion of the electrical connection to the terminal connector with which the lead wire is used may be carried out in substantially the same manner as described above in connection with the embodiment illustrated in Figures 1 to 7. That is, a bared end portion of the conductor 87, having a length desirably a little less than the axial length of the clip member, will first be bent back over that member; this end of the lead wire will then be inserted in the conductor-receiving portion of the connector and the mechanical and electrical connection between the two will be effected by a crimping operation, desirably of the type wherein opposed indentations are produced at spaced intervals around the periphery of the conductor-receiving portion.

Also, as in the previously described embodiments, the initial effect of the crimping operation will be to tighten the clip or band member on the conductor insulation until the opposed edge surfaces of that member (the edge surfaces of the portions 79 and 81) are brought into engagement with each other. The clip or band member will then act as a compression-resisting sleeve and further crimping will produce mutual deformation of the conductor-receiving portion and the clip or band element. As previously described, maximum strength will be attained in the resulting joint when the cylindrically-shaped sleeve produced by wrapping the clip or band element around the lead wire insulation has a compressive strength which is at least substantially equal to the compressive strength of the tubular connector portion with which it is used. Both the conductor-receiving portion and the sleeve element provided by the clip or band member must be yieldable, desirably to the same degree. The construction illustrated in Figures 11 through 15 is particularly adapted for use in connection with automatic clip applying mechanisms.

The connector terminal illustrated in Figures 1 through 7 includes a wall or stop element (lug 33) which projects into the conductor receiving portion of the connector barrel 13 at right angles to the longitudinal axis thereof and which serves, among other functions, to provide a positioning stop for the lead end which, together with the clip or band member, is inserted into the conductor-receiving portion of the connector prior to the crimping operation. In the quantity production of large numbers of mono-cord connectors, it is, of course, essential that the relative positioning of the conductor-receiving portion of the terminal connector and the lead wire and clip which are introduced thereinto shall be maintained quite accurately, and this is accomplished by the lug or stop 33.

In some instances, however, it would be much more satisfactory if the band or clip member included positioning means constituting an integral part of that member. This means may comprise an integral lug positioned at one edge of the band or clip and adapted to be bent over to provide a right angle projection extending radially outward from the lead wire insulation when the clip is applied thereto, and an example of such an arrangement is illustrated in Figure 16. In that figure, there is shown at 91 a strip of interconnected clip or band elements 93, each of which is substantially identical to the clip or band elements 71, except that each includes a pair of integral tabs or lugs 95 which project from the upper edge 97 thereof. The clip or band members 93 are used in exactly the same manner as the previously described units, that is, they are wrapped around the end of a suitable lead wire or conductor cord, as for example, the lead wire illustrated at 99 in Figure 17. The application of the clip or band elements to the lead wire insulation is carried out in such manner that the tab elements 95 are positioned away from the bared end portion of the lead wire conductor, and those tabs are bent, either during or after the applying operation, so as to extend radially outward from the lead wire, as shown in Figure 17.

It will be evident that this construction provides at least one projection which, when the clip or band elements are applied to the lead wire, provides a stop or positioning means for determining the relative location of the end of the lead wire and the compression-resisting sleeve within the tubular conductor-receiving portion of the associated terminal connector. In instances where it is desired that the clip or band element shall be located at some predetermined position within the conductor-receiving portion, the tabs may be elongated and bent intermediate their length, as indicated by the dotted outline 101. Additionally, by making the tabs of sufficient length to project beyond the outer surface of the conductor-receiving portion of the terminal, the tabs may be used as a means for anchoring and positioning the insulating sleeve which is usually placed over the conductor-receiving portion of the connector. A construction of this type is illustrated in Figure 17 where the tab portions 95 are illustrated as extending into the body of a suitable grip sleeve 103 which may be similar to the sleeve 25.

In the foregoing, we have disclosed an improved type of crimped-on connection which is especially adapted for use in attaching lead wires to electrical terminal connectors of the type having a thin walled (i. e. .010 to .025 inch), deformable, tubular portion for receiving the lead wire. The invention includes the important novel concept of applying a band or clip member of special design and characteristics to the insulation of the lead wire with which the connector is used, so as to provide a compression-resisting, sleeve-like member, having certain particular mechanical characteristics, within the conductor-receiving portion of the connector. This constructional arrangement effectively limits the amount of compressive stress which is transmitted to the lead wire insulation during the subsequent crimping operation and, in addition, renders the mechanical and electrical properties of the crimped connection between the lead wire conductor and the terminal connector substantially independent of the mechanical properties of the lead wire insulation. The net result of the arrangement is the provision of an improved type crimped-on connection which is of very low electrical resistance and of excellent mechanical properties, and which is capable of maintaining these desirable electrical and mechanical characteristics throughout its useful life.

The invention also makes possible the convenient obtaining of a strain relief function as a concomitant part of the connection-producing operation. This results from the fact that the bending back of the wire conductor over the clip or band used to produce the inner compression-resisting member introduces an amount of slack into the length of the wire conductor, which permits quite substantial axial movement of the lead wire without causing the transmission of mechanical stress to the electrical connection. This feature is augmented by virtue of the fact that the band or clip construction of the invention makes it possible to adjust within quite close limits the magnitude of the gripping force applied to the wire insulation as an incident to the crimping operation, with the result that the end portion of the lead wire is resiliently connected to the terminal connector through the lead wire insulation, independently of the electrical connection.

A further important feature, which contributes to the obtaining of the improved, crimped-on type connection of the invention, results from the fact that the clip or band member which is applied to the lead wire or cord insulation includes interfitting or overlapping elements which provide a continuous surface peripherally of the clip or band after its application to the lead wire, and this, despite the fact that the end portions of the clip or band are normally spaced-apart a short distance. The provision of a continuous surface peripherally of the clip or band is of particular importance when the connection is used with a stranded wire conductor, because it effectively prevents the individual wire strands from getting between the spaced ends of the clip or band so as to interfere with the gripping of the wire insulation by that member during the crimping operation. The interfitting elements also aid in guiding movement of the band during the crimping operation, so as to assure the development of the desired mechanical properties. The particular clip or band constructions disclosed may also include integral positioning means for assuring accurate positioning of the clip or band and its associated lead wire within the contact-receiving portion.

In addition to the novel crimped-on connection which has been disclosed in the foregoing, we have also disclosed a mono-cord, plug-type connector terminal which has important advantages over constructions previously known to the art. This improved plug connector, as illustrated in the drawings, is intended to utilize a crimped-on type connection of the improved type disclosed therein, and includes structural features of particular value in the making of such connections, one feature of especial importance in this regard being the depending lug or barrier within the connector barrel. This lug or barrier assures accurate and substantially automatic positioning of the lead wire and its associated clip within the conductor-receiving portion of the terminal during the crimping operation, and is of great importance in assuring the production of high quality connections of the type herein disclosed.

Various of the features of the invention believed to be new are set forth in the accompanying claims.

We claim:

1. In combination, a lead wire which includes an electrical conductor, an electrical terminal connector having a tubular section adapted to receive a bared end portion of said conductor, a compression-resisting sleeve member disposed within said conductor-receiving portion, an end portion of the electrical conductor of said lead wire extending between the outer surface of said sleeve and the inner surface of said conductor-receiving section, and said conductor, said sleeve and the conductor-receiving section of said terminal connector being united by crimped-in sections formed therein.

2. Apparatus as defined in claim 1, wherein the sleeve member is at least as strong in resisting compression as the tubular, conductor-receiving section of said connector and wherein said conductor-receiving section and said sleeve member are made of metal having substantially the same yield point.

3. In combination, an electrical terminial connector which includes a deformable, thin-walled, tubular, conductor-receiving section, a lead wire which includes an electrical conductor and an insulating jacket overlying said conductor, said insulating jacket being removed from an end portion of said leadwire conductor to provide a section of bare conductor having a length equal to the length of at least a substantial portion of said conductor-receiving section, means defining a compression-resisting sleeve which overlies said insulating jacket adjacent the bared end section of said lead wire conductor, said bared end section being folded back over said sleeve defining member, said sleeve and said folded-back end section of said conductor being positioned within the conductor-receiving section of said connector and being joined thereto by spaced-apart, crimped-in sections formed therein.

4. In combination, a terminal connector having a thin-walled, deformable, generally tubular conductor-receiving portion, a lead wire which includes an electrical conductor and an insulating jacket overlying said conductor, said insulating jacket being removed from an end of said conductor to provide a bared end portion, a flat band of metal positioned around and in contact with said insulating jacket adjacent said bared end portion so as to define a generally cylindrical, compression-resisting, sleeve member, the opposed ends of said band including cooperating surfaces which are adapted to abut against each other when said band is compressed and limit the extent to which said sleeve-defining band may be tightened upon said insulating jacket, the bared end portion of said conductor being folded back over said sleeve-defining band, the folded-back end of said lead wire conductor and said sleeve-defining band being disposed within the conductor-receiving portion of said terminial connector, and said conductor-receiving portion, said sleeve-defining band and the folded-back end of said lead wire conductor being mechanically and electrically connected together by spaced-apart, crimped-in sections extending inwardly from the outer surface of said conductor-receiving portion into said sleeve-defining band.

5. Apparatus as defined in claim 4, wherein said sleeve-defining band includes an outwardly projecting lug portion disposed at one end thereof for engagement with the open end edge of said conductor-receiving portion to thereby locate the sleeve enclosed end of said lead wire within said connector receiving portion.

6. In combination, a terminal connector having a thin walled, deformable, generally tubular conductor-receiving portion, a lead wire which includes a stranded, flexible, electrical conductor and an insulating jacket overlying said conductor, said insulating jacket being removed from an end of said conductor to provide a bared end portion, a flat band of metal positioned around and in contact with said insulating jacket adjacent said bared end portion so as to define a generally cylindrical, compression-resisting sleeve member, the opposed ends of said band including at least one projection and one recess, into which said projection is adapted to fit, and cooperating surfaces which are adapted to abut against each other when said band is compressed, so as to define the extent to which said band can be tightened upon said insulating jacket, the shape of said interfitting projection and recess elements being such that there is provided a continuous surface peripherally of said band following its application to said lead wire insulation, the bared end portion of said stranded conductor being folded back over said sleeve-defining band, the folded back end of said conductor and said sleeve-defining band being disposed within the conductor-receiving portion of said terminal connector, and said conductor-receiving portion, said sleeve-defining band and the folded-back end of said lead wire conductor being mechanically and electrically connected together by spaced-apart, crimped-in sections extending inwardly from the outer surface of said conductor-receiving portion into said sleeve-defining band.

7. In combination, a lead wire, a terminal connector comprising a thin-walled, generally tubular, metallic barrel, one end of which is adapted to receive an end of said lead wire, said lead wire including an electrical conductor and an insulating jacket overlying said conductor, and said insulating jacket being removed from an end of said conductor to provide a bared end portion, a flat band of metal positioned around and in contact with said insulating jacket adjacent said bared end portion so as to define a generally cylindrical, compression-resisting sleeve member, said bared end portion being folded back over said sleeve-defining band the folded-back end of said lead wire conductor and said sleeve-defining band being disposed within the lead wire receiving portion of said barrel, said barrel being provided with an inwardly extending, wall section which is integral therewith for positioning the folded back end of said wire conductor and said sleeve-defining band within the lead wire receiving portion thereof, and said barrel, said sleeve-defining band and the folded back end of said lead wire conductor being mechanically and electrically connected together by spaced-apart, crimped-in sections extending inwardly of the outer surface of the lead wire receiving portion of said barrel into said sleeve-defining band.

8. Apparatus as defined in claim 7, wherein said positioning wall section constitutes a section of metal which is partially cut away from the defining wall of said barrel and is bent inwardly into said barrel so as to extend in a direction generally transverse to the longitudinal axis of said barrel.

9. In an electrical connector of the mono-cord plug type for use with jack contacts, the improvement comprising a hollow, tubular conductor part having a plurality of openings through the wall thereof with at least one of said openings being formed by shearing and bending a section of said tubular part inwardly to afford a barrier between adjacent portions of the inside of said tubular part, a removable contact element held in place in one end portion of said tubular part by means including said openings, said removable contact element being located axially in said tubular part by said barrier, and a lead wire fixedly disposed in the other end portion of said tubular part in abutting relation to said barrier.

10. In an electrical connector of the mono-cord plug type for use with jack contacts, the improvement comprising a hollow, tubular conductor part having an opening through the wall thereof at an intermediate portion therealong, said opening being formed by shearing and bending a section of said tubular part inwardly to afford a barrier between axially adjacent portions within said tubular part, a removable contact element located axially in said tubular part at one end portion thereof by said barrier and fixedly positioned therein by means including said opening, and a lead wire fixedly disposed in the other end portion of said tubular part in abutting relation to said barrier.

11. In combination, a terminal connector having a thin walled, deformable, generally tubular conductor-receiving portion, a lead wire which includes a stranded, flexible, electrical conductor and an insulating jacket overlying said conductor, said insulating jacket being removed from an end of said conductor to provide a bared end portion, a flat band of metal positioned around and in contact with said insulating jacket adjacent said bared end portion so as to define a generally cylindrical, compression-resisting sleeve member, the opposed ends of said band being disposed at least in part in abutting relationship and including at least one projection and one offset surface portion for receiving said projection in overlapping relation thereto, so that there is provided a continuous surface peripherally of said band following its application to said lead wire insulation, said abutting end portions of said band defining the extent to which said band can be tightened upon said insulating jacket, the bared end portion of said stranded conductor being folded back over said sleeve-defining band, the folded back end of said conductor and said sleeve-defining band being disposed within the conductor-receiving portion of said terminal connector, and said conductor-receiving portion, said sleeve-defining band and the folded-back end of said lead wire conductor being mechanically and electrically connected together by spaced-apart, crimped-in sections extending inwardly from the outer surface of said conductor-receiving portion into said sleeve-defining band.

12. Apparatus as defined in claim 11, wherein said compression-resisting sleeve member includes a portion forming an outwardly projecting lug disposed at one end of said sleeve member for engagement with the open end edge of said conductor-receiving portion to thereby locate said band and the folded-back end of said lead wire conductor within said connector-receiving portion.

13. An electrical connector comprising a deformable, thin-walled, tubular member, a lug extending into said tubular member and defining a plug receiving section and a conductor receiving section, a lead wire having an insulating jacket and a bared end portion received within said conductor receiving section, means defining a compression resisting sleeve overlying said insulating jacket adjacent said bared end portion, said bared end portion being folded back over said sleeve-defining means and having a portion abutting said lug, said sleeve and the folded back portion of the conductor being joined to said tubular member by spaced apart, crimped sections, a plug closing one end of said plug receiving section, and a spring member engageable with said plug and having an end portion bottomed against said lug.

References Cited in the file of this patent
UNITED STATES PATENTS

| | | |
|---|---|---|
| 2,279,794 | Olson | Apr. 14, 1942 |
| 2,288,348 | Funk | June 30, 1942 |
| 2,330,948 | Brand | Oct. 5, 1943 |
| 2,339,147 | Carlisle et al. | Jan. 11, 1944 |
| 2,385,792 | Carlson | Oct. 2, 1945 |
| 2,490,632 | Andersson et al. | Dec. 6, 1949 |
| 2,564,098 | Dorjee | Aug. 14, 1951 |